US006513245B1

(12) United States Patent
Aubriot

(10) Patent No.: US 6,513,245 B1
(45) Date of Patent: *Feb. 4, 2003

(54) TUBE CUTTING PLIERS

(75) Inventor: Claude Aubriot, Danery (FR)

(73) Assignee: Virax, S.A., Epernay Cedex (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,384

(22) Filed: Sep. 5, 1997

(30) Foreign Application Priority Data

Sep. 10, 1996 (FR) ........................................ 96 11164

(51) Int. Cl.[7] ........................................ B23D 21/06

(52) U.S. Cl. .............................. 30/92; 30/134; 30/186; 30/259

(58) Field of Search .......................... 30/134, 175, 186, 30/91.2, 92, 254, 259; 81/416

(56) References Cited

U.S. PATENT DOCUMENTS

| | | | | | |
|---|---|---|---|---|---|
| 11,679 | A | * | 9/1854 | Phares | 30/259 |
| 86,138 | A | * | 1/1869 | Copeland | 30/92 |
| 136,964 | A | * | 3/1873 | Broadbooks | 30/259 |
| 1,716,180 | A | * | 6/1929 | Marler | 30/186 |
| 1,831,609 | A | * | 11/1931 | Schroder | 30/186 |
| 1,963,564 | A | * | 6/1934 | Smith et al. | 30/186 |
| 2,716,365 | A | * | 8/1955 | Keeley, Jr. | 81/186 |
| 2,734,268 | A | * | 2/1956 | Grinling | 30/186 |
| 3,273,240 | A | * | 9/1966 | Florian | 30/192 |
| 4,434,555 | A | * | 3/1984 | Stoll | 30/92 |
| 5,012,579 | A | * | 5/1991 | Matsumoto | 30/92 |
| 5,070,616 | A | * | 12/1991 | Chen | 30/92 |
| 5,218,765 | A | | 6/1993 | Huang | 30/92 |
| 5,373,639 | A | * | 12/1994 | Huang | 30/92 |
| 5,718,051 | A | * | 2/1998 | Huang | 30/92 |

FOREIGN PATENT DOCUMENTS

| | | | | |
|---|---|---|---|---|
| CA | 1178426 | | 11/1984 | |
| DK | 82275 | * | 10/1956 | 30/254 |
| GB | 077616 | * | 7/1981 | 30/92 |
| SU | 508394 | * | 6/1976 | 30/134 |

* cited by examiner

*Primary Examiner*—Allan N. Shoap
*Assistant Examiner*—Stephen Choi
(74) *Attorney, Agent, or Firm*—Younf & Basile, P.C.

(57) ABSTRACT

A pinching tube cutting device to transversely cut a tube made of a plastic material. The device consists of two handles attached to each other in a pivoting movement around an axis wherein one handle contains a cutting blade at its end while the end of the other handle contains a hollow seat to receive the tube. The blade has two sharp edges making a salient angle between 120° and 150°, in such a manner that an angle ($\alpha$) formed by the sharp edge furthest from the axis and a line passing through the point of the blade and the axis is larger than the angle ($\beta$) formed by the other sharp edge and the line. The point of the blade describes a circular arc which cuts the segment of a line which joins the axis and the center of the tube with the largest diameter possible to rest in the seat.

10 Claims, 4 Drawing Sheets

Fig.1a
PRIOR ART
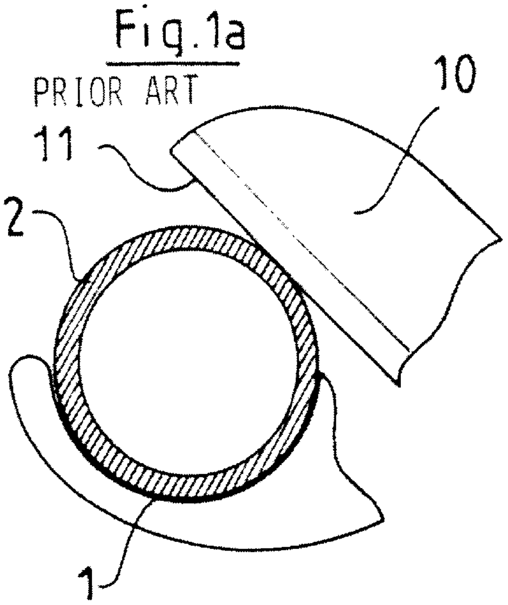
Fig.1b
PRIOR ART
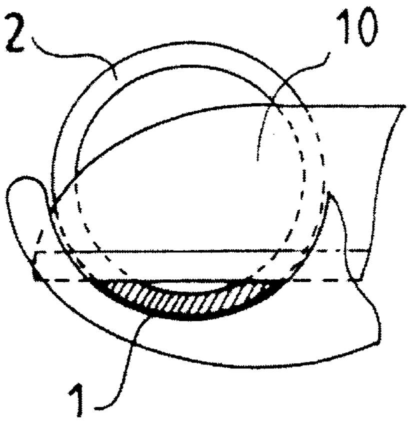
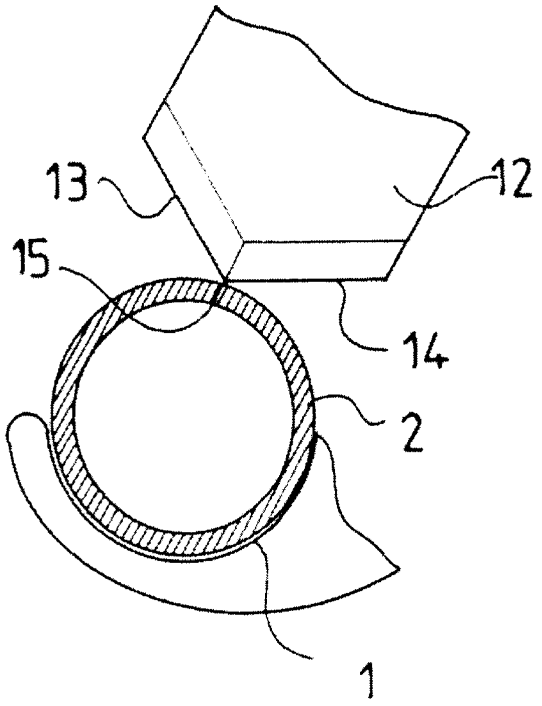
Fig.2a
PRIOR ART
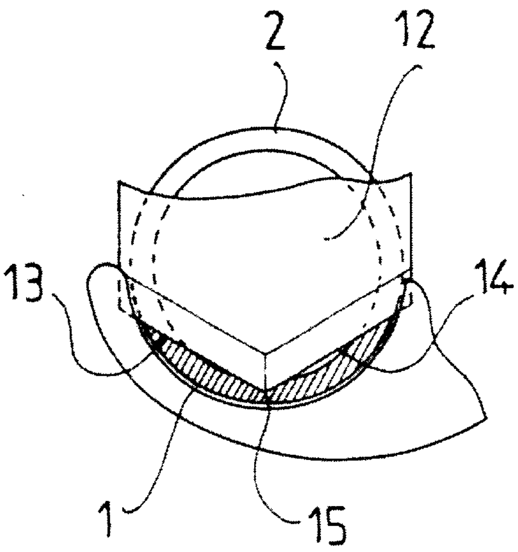
Fig.2b
PRIOR ART

TUBE CUTTING PLIERS

BACKGROUND OF THE INVENTION

This invention relates to a pinching tube cutting device to crosswise cut a tube made of plastic material.

One already knows of such tube cutting pliers. Such pliers are made up of two handles connected to each other around a transversal axis, of which one handle contains a cutting blade at its end, while the end of the other contains a seat designed to receive the tube to be cut.

In general, a tube cutting device contains a blade with a rectangular sharp edge. This presents the inconvenience of necessitating a considerable strain at the beginning of the cut. In effect, the blade attacks the tube tangentially and the tube has the tendency to slightly flatten in such a way that the contact zone between the blade and the tube is a line, which makes the beginning of the cut difficult, with the risk of crushing the tube and, also, deforming the tube.

This inconvenience manifests itself more particularly where the tubes are of a large diameter and, more specifically, where the proportion between diameter/thickness of the tube is large and the tube is then of a lesser rigidity.

In order to partially compensate for this inconvenience, it has been proposed tube cutting objects which allow the creation of a cut called pulled or "while pulling"; that is to say that instead of placing the pivoting axis near the coincidental line with the blade, the axis is moved away, such that the classic cut is associated with a translation of movement from the blade to the object to be cut.

Others have proposed tube-cutting pliers containing, like tube cutters of the guillotine type, a blade with two sharp edges making an obtuse salient angle and including a point which allows the beginning of the cut with little effort while avoiding the crushing of the tube, however, at the end of the cut the two sharp edges simultaneously and tangentially attack the internal surface of the tube, which necessitates a considerable effort.

It would be possible, however, to remedy this inconvenience by using a blade such that the two sharp edges form an acute angle, but this would necessitate a considerable path for the blade, and a significant spread of the handles of the tool which would not facilitate its use.

One also knows, from document CA-A1 178 426, a tube cutting device which contains a blade with two sharp edges forming between them an angle of between 70° and 100°, and preferably 85°, with the sharp edge closer to the pivoting axis making an angle with the horizontal between 20° and 60°, and preferably 55°, while the other sharp edge makes an angle with the horizontal between 20° and 60°, and preferably 40°.

If this device allows the production of a more efficient cut than other existing devices, it does not solve the other inconveniences, such as the angle that the sharp edges form which necessitates a large opening of the handles and requires a considerable force at the beginning of the cut and limits the capacity of the cut and, at the end of the cut, despite the angular gap of the sharp edges compared to the horizontal, there exists a phase where the sharp edges attack the internal side of the tube from the interior in a simultaneous and tangential manner, which as a consequence necessitates a considerable effort.

SUMMARY OF THE INVENTION

The present invention has as an aim to remedy these diverse inconveniences by proposing a pinching tube cutting device of which the use is easier than that of the existing devices, since it does not necessitate a considerable effort at the beginning or at the end of the cut.

The pinching tube cutting device of the present invention consists of two handles connected to each other in such a way that the two handles pivot around a transversal axis, of which one is fitted at its end with the cutting blade, and the end of the other handle consists of a hollow seat designed to receive the tube to be cut. The device is characterized by the two sharp edges of the blade forming an obtuse, salient angle between them between 120° and 150°, and in such a manner that the angle formed by the sharp edge furthest from the transversal axis and a line passing through the point of the blade is larger than that formed by the other sharp edge and the line. The point describes, during its pivoting, a circular arc which cuts the segment of the line which joins the pivoting axis and the center of the tube of the largest diameter possible to rest in the seat, in such a way that the beginning of the cut is achieved by the point and the end of the cut is achieved only by the sharp edge the furthest from the pivoting axis.

According to an additional characteristic of the device of the invention, the sharp edges of the blade make an angle of 135°.

According to an additional characteristic of the device of the invention, the circular arc which is described by the point of the blade cuts the right segment joining the pivoting axis in the center tube of the largest diameter possible to rest in the seat at a point situated in the middle region of the radius of the tube.

According to an additional characteristic of the device of the invention, the angle formed by the sharp edge furthest from the pivoting axis and the line passing by the point of the blade and the axis is double that formed by the other sharp edge and the line.

The tube cutting device according to the invention is designed to cut in an optimum manner a tube of a diameter which corresponds to that of the seat. It allows, however, the cutting of tubes of a smaller diameter, even those where the diameter is too small to allow the beginning of the cut by means of the point of the blade. In this case, the proportion diameter/thickness of the tube is weak, and the sharp edge furthest from the pivoting axis suffices then to produce a perfect cut without considerable effort, so that the cut is done "while pulling".

In addition, in order to allow the wedging of the tube with a very small diameter so that it does not escape from the seat during the cut, the seat contains on its edge furthest from the pivoting axis a notch where the tube can be seated.

In addition, the effect of the cutting "while pulling" has the tendency to lead the tube towards the bottom of the seat.

BRIEF DESCRIPTION OF THE DRAWING

The advantages and characteristics of the present invention will come out more clearly in the description which follows and which relates to the attached drawing, which represents a non-limiting embodiment thereof in which:

FIGS. 1*a* and 1*b* represent partial schematic views of an existing prior art, pinching tube cutting device during the two steps of a cut;

FIGS. 2*a* and 2*b* represent partial schematic views of another existing pinching tube cutting device during the two steps of a cut;

DESCRIPTION OF THE PREFERRED EMBODIMENTS

Figure 3:
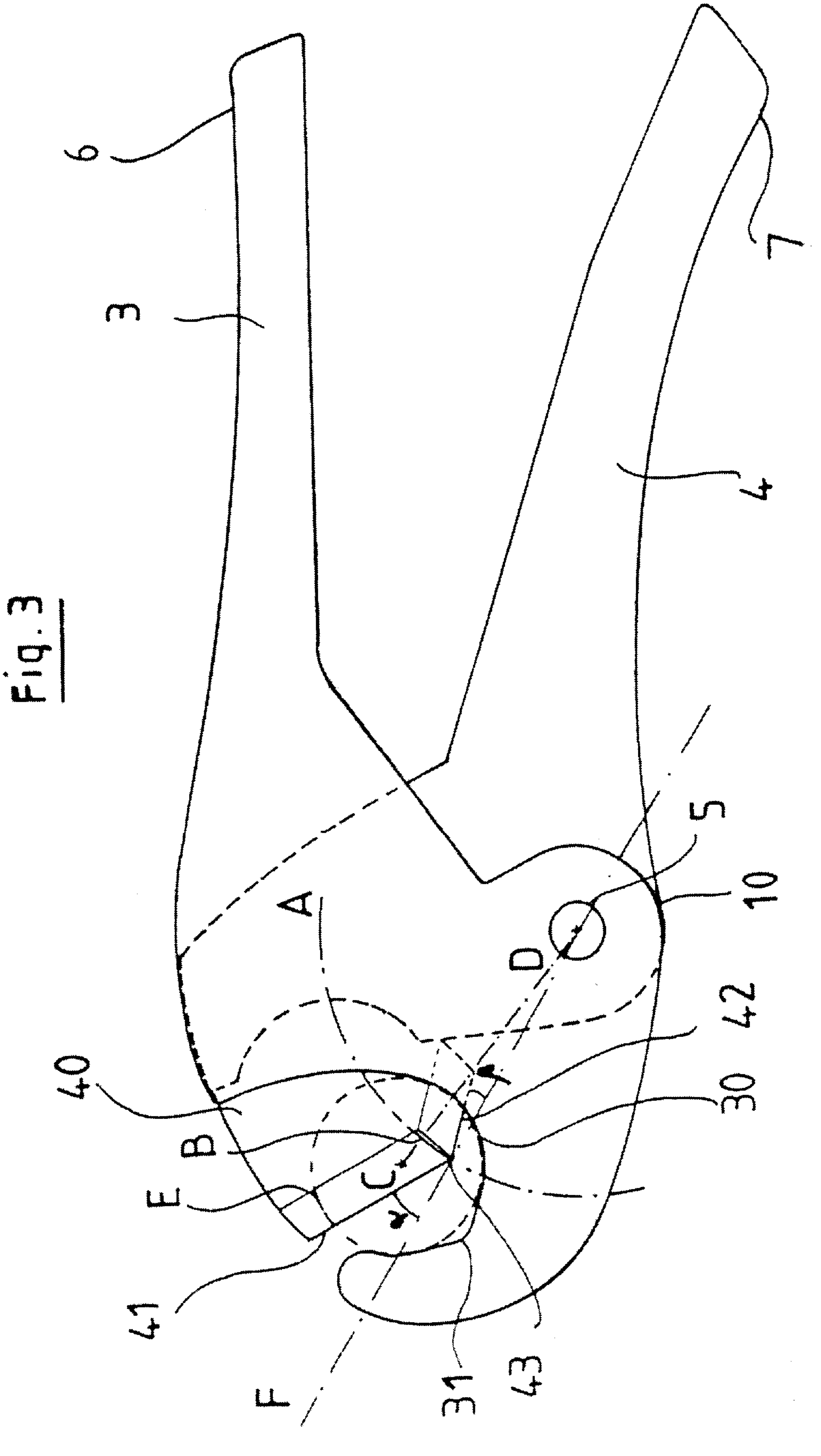
FIG. 3 represents a side elevational view of a pinching tube cutting device according to the inventor.

If one refers to FIGS. 1*a* and 1*b*, one can see an existing pinching tube cutting device consisting of a seat 1 designed to receive a tube 2 to be cut, and a blade 10 which contains a rectangular sharp edge 11.

In FIG. 1*a*, one can see the beginning of the cut, the sharp edge 11 attacking the tube 2 tangentially which necessitates a considerable effort, all the more so as the tube 2 has the tendency to be crushed.

In FIG. 1*b*, one can see that during the end of the cut there is not the risk of crushing since the part of the tube 2 remaining to be cut is in contact with the seat 1, while, on the other hand, the line of the cut stays considerable.

If one refers now to FIGS. 2*a* and 2*b*, one can see another existing pinching tube cutting device which consists of a blade 12 containing two sharp edges 13 and 14 forming between them an obtuse salient angle, which allows the tube 2 to be attacked by a point 15, as shown in FIG. 2*a*, therefore avoiding the risk of crushing the tube 2 and limiting the effort to be expended.

On the other hand, as represented in FIG. 2*b*, the end of the cut requires a considerable effort because the sharp edges 13 and 14 tangentially attack the internal side of the tube 2 simultaneously along two lines.

If one refers now to FIG. 3, one can see a pinching tube cutting device according to the invention. The device consist of two handles 3 and 4 mounted so that they pivot on an axis 5, the handle 3 containing at its first end a seat 30 in the form of a circular arc, while the handle 4 contains a cutting blade at its first end opposite from the seat 30. Each handle has a gripping portion at its second end 6, 7, respectively.

It is notable that the seat 30 can also be in the shape of a V.

The blade 40 consists of two sharp edges 41 and 42 forming between them an angle of 135°, and creating a point 43 which describes, during pivoting, a circular arc A cutting by a point B the segment of the line D joining the pivoting axis 5 and the center C of the circle E which correspond to the tube of the largest diameter possible to rest in the seat 30.

The length of the segment CB can be made up of between the proportions of R/5 and R/1.25, where R is the radius of the circle E, with the optimum value being R/2.25.

Figure 4A:
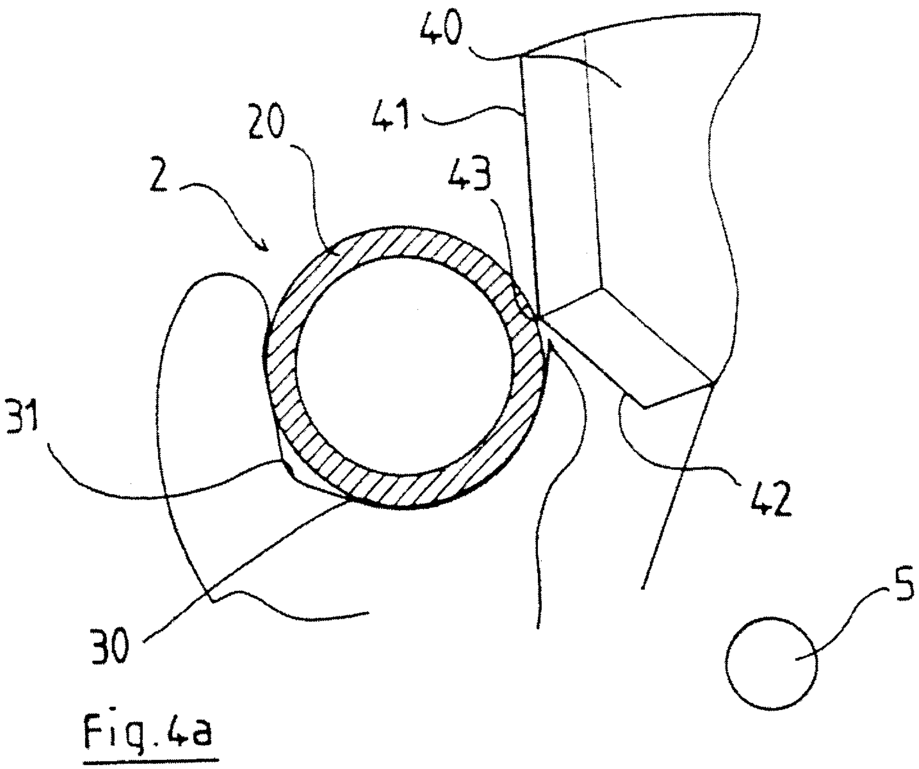
FIGS. 4*a*, 4*b*, 4*c* and 4*d* represent schematic views of the device shown in FIG. 3, during different steps of cutting.
Figure 4B:
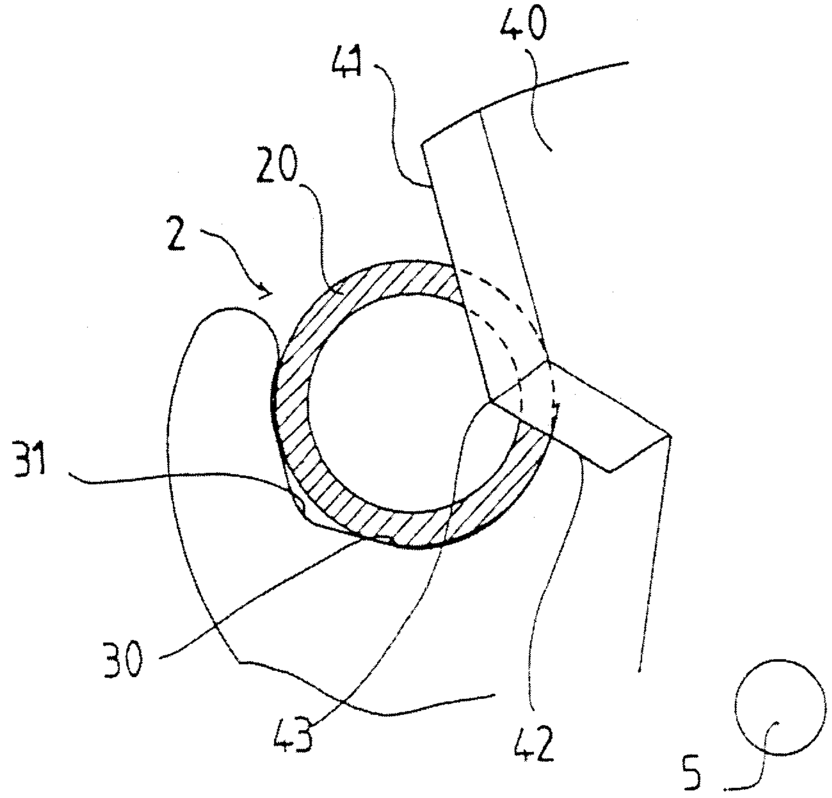
Figure 4C:
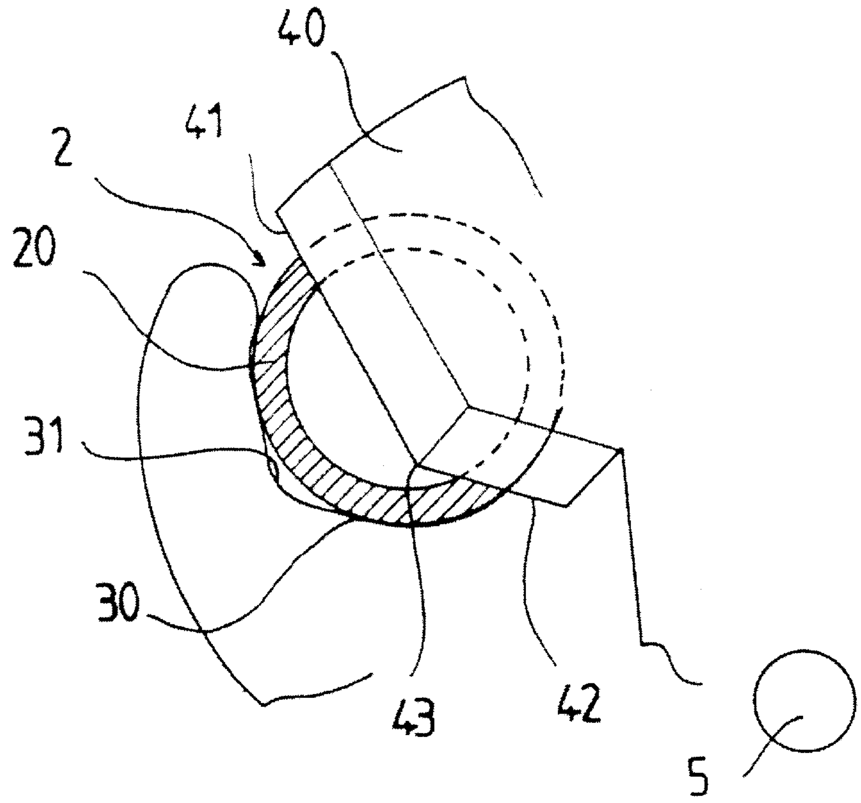
Figure 4D:
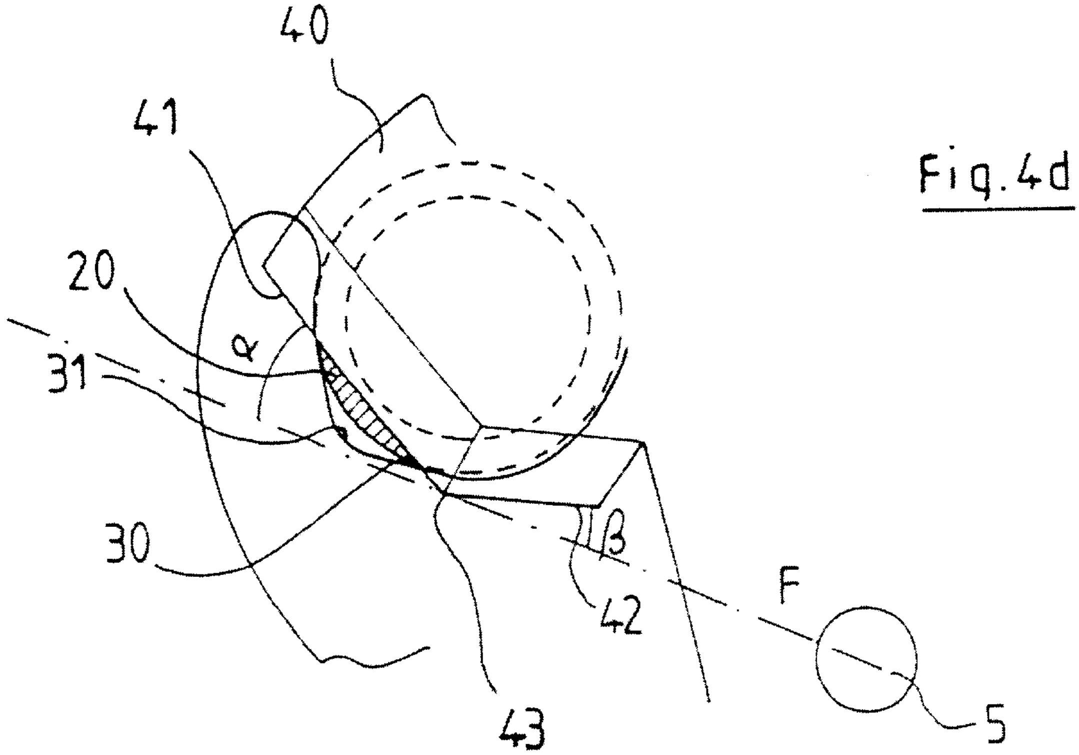

Also, the angle a formed by the sharp edge 41 and a line F passing through the axis 5 and the point 43 is larger than the angle $\beta$ formed by the sharp edge 42 and the line F, as shown in FIG. 4*d*. In a preferred method of production, the angles $\alpha$ and $\beta$ are, respectively, 30° and 15°.

If one refers now to FIGS. 4*a*, 4*b*, 4*c* and 4*d*, one can see different steps of the cut of a tube 2.

In FIG. 4*a*, the blade 40 attacks the tube 2 by its point 43, the beginning of the cut can therefore be achieved without effort and without deforming the tube 2.

In FIGS. 4*b* and 4*c*, the sharp edges 41 and 42 cut the internal side of the tube 2 in the direction of the thickness which corresponds to the minimum effort to be furnished.

In FIG. 4*d*, the sharp edge 42 has crossed the tube 2 and the sharp edge 41 is achieving the cutting of the tube 2 tangentially without risk of deforming and without effort like a classic blade with only one sharp edge, benefiting further the "while pulling" effect because of the size of angle $\alpha$.

One can also see in these figures that the seat 30 contains a notch 31 allowing the wedging of a tube with a small diameter, such that the cut will be achieved only by using the sharp edge 41.

What is claimed is:

1. A pinching tube cutting device for transversely cutting an elongated plastic tube having a predetermined radius and having a longitudinal axis through a centerpoint comprising:

two handles connected one to the other in a pivoting movement around a pivot point, and each handle having a outer peripheral edge, a center axis, and a head which is extended by an elongated portion forming a gripping portion, the head of the first handle having a cutting blade and the head of the second handle having a hollow seat having an arcuate surface with another predetermined radius essentially equal to the predetermined radius of the tube for receiving the tube to be cut, said pivot point positioned offset relative to the first and second gripping portions so that the pivot point is proximate to the outer peripheral edge of the first handle and spaced from the cutting blade and hollow seat wherein said pivot point is positioned closer to the center axis and gripping portion of the first handle than the center axis and gripping portion of the second handle for providing a large area of rotation for the blade, and the blade movable to rotate in a cutting direction and a reverse direction in response to the pivoting movement of the two handles, the blade having an outer sharp edge and an inner sharp edge forming a point of the blade therebetween, the inner sharp edge positioned closer to the pivot point than the outer sharp edge, and the point of the blade positioned for intersecting an imaginary first straight line defined as passing between the pivot point and the centerpoint for the radius of the seat, said point of the blade intersecting the imaginary first straight line at a position point spaced from the centerpoint and between the pivot point and centerpoint when said blade rotating in the cutting direction for preventing any flattening of the tube.

2. The device according to claim 1 wherein the outer sharp edge and inner sharp edge of the blade make an angle of 135° therebetween.

3. The device according to claim 2, wherein the point of the blade intersects the first straight line at a position spaced from the centerpoint for the radius of the hollow seat by a distance between the values defined by R/5 and R/1.25, wherein R is the radius of the arcuate hollow seat.

4. The device according to claim 3, wherein the distance between the position point and the centerpoint for the radius of the hollow seat is R/2.25.

5. The device according to claim 1 wherein a second straight line is defined as passing through the pivot point and the point of the blade, and an angle ($\alpha$) formed by the outer sharp edge and the second straight line is twice as large as an angle ($\beta$) formed by the inner sharp edge and the second straight line.

6. The device according to claim 1 wherein the seat has an arcuate notch in the seat.

7. The device according to claim 2, wherein the distance between the position point and the centerpoint for the radius of the hollow seat is R/2.25.

8. The device according to claim 2 wherein the seat has a notch in the seat.

9. The device according to claim 2 further including means for ending the cutting of the tube with only the outer sharp edge, the means for ending the cutting comprising, the outer sharp edge having a longer length than the length of the inner sharp edge.

10. The tube cutting device of claim 1, wherein an angle of the blade between the outer sharp edge and the inner sharp edge ranges between 120° an 150°.

* * * * *